United States Patent [19]

Candries et al.

[11] Patent Number: 5,300,551

[45] Date of Patent: Apr. 5, 1994

[54] PROCESS FOR THE PRODUCTION FOR MULTIMODAL LATICES OF VINYL CHLORIDE POLYMERS

[75] Inventors: Paul Candries, Grimbergen, Belgium; Haimo Zekoll, Hallein, Austria

[73] Assignee: Solvay, Brussels, Belgium

[21] Appl. No.: 760,456

[22] Filed: Sep. 17, 1991

[30] Foreign Application Priority Data

Sep. 17, 1990 [BE] Belgium .............................. 09000884

[51] Int. Cl.$^5$ ................................................ C08F 2/16
[52] U.S. Cl. .................................. 524/458; 523/201; 523/221
[58] Field of Search ................. 523/201, 221; 524/458

[56] References Cited

U.S. PATENT DOCUMENTS 4,046,730  9/1975  Tortai .................................. 523/221

FOREIGN PATENT DOCUMENTS 0025561  3/1981  European Pat. Off. .
1318956  1/1963  France .
2286152  4/1976  France .

OTHER PUBLICATIONS

Polymer Handbook, Eds.-Brandrup et al, 2nd Edition, 1975, pp. II-483-II-497.

*Primary Examiner*—Joseph L. Schofer
*Assistant Examiner*—Peter D. Mulcahy
*Attorney, Agent, or Firm*—Spencer, Frank & Schneider

[57] ABSTRACT

The multimodal latices are produced by nonmicellar aqueous emulsion polymerization of vinyl chloride in the presence of a seed consisting of a multimodal latex originating from a preceding polymerization cycle. The mean size of the elementary particles of the multimodal latices produced is identical to that of the elementary particles of the seed. The latter preferably consists of three classes of elementary particles which have mean diameters of between 0.15-0.30 μm, between 0.45-0.60 μm and between 1.05-1.25 μm respectively.

The vinyl chloride polymers originating from the multimodal latices are particularly suitable for the manufacture of low-viscosity plastisols.

9 Claims, No Drawings

PROCESS FOR THE PRODUCTION FOR MULTIMODAL LATICES OF VINYL CHLORIDE POLYMERS

The present invention relates to a process for the production of multimodal latices of vinyl chloride polymers. It relates more particularly to a process for the production of multimodal latices of vinyl chloride polymers by seeded aqueous emulsion polymerization of vinyl chloride, which are particularly suitable for the manufacture of low-viscosity plastisols.

Vinyl chloride polymers intended for the manufacture of plastisols, also called pastes, usually take the form of a fine powder consisting of particles whose volume average diameter is between 5 and 20 $\mu m$, which is obtained by milling coenospheres resulting from the spray-drying of vinyl chloride polymer latices whose elementary particles have mean diameters of between 0.1 and 2 microns ($\mu m$). It is known that plastisols or pastes of higher quality and of low viscosity are obtained when use is made of vinyl chloride polymers originating from multimodal latices comprising a number of classes of elementary particles whose respective mean diameters fall within the abovementioned range. Known techniques for producing multimodal latices consist, for example, in mixing a number of monomodal seed latices in known proportions or in polymerising vinyl chloride with seeding by means of a number of monomodal seed latices, this latter technique being sometimes called "multiseeding". These processes have the disadvantage of requiring, in each polymerization cycle, the use of a number of monomodal seed latices which are prepared beforehand in stages which are separate from those of obtaining the multimodal latex intended for the manufacture of pastes. They consequently demand considerable capital investments and leave much to be desired where production efficiency is concerned.

The present invention is aimed at providing an improved process for the production of multimodal latices of vinyl chloride polymers, which does not exhibit the abovementioned disadvantages and which makes it possible to obtain vinyl chloride polymer latices suitable for the manufacture of low-viscosity plastisols To this end, the invention provides a process for the production of multimodal latices of vinyl chloride polymers by seeded aqueous emulsion polymerization of vinyl chloride, characterised in that the nonmicellar aqueous emulsion polymerisation of vinyl chloride is initiated in the presence of a seed consisting of a multimodal latex originating from a preceding polymerization cycle.

A surprising effect of the process according to the invention lies in the fact that seeding by means of the multimodal vinyl chloride polymer latex originating from a preceding polymerization cycle results in multimodal latices in which the classes of elementary particles have mean particle sizes identical to those of the seed. In other words, once the initial multimodal seed latex has been prepared and the seeded polymerization process has been initiated, it is no longer necessary to produce and to store seed latices, the seed consisting of a portion of the latex produced during a preceding polymerization cycle. The process according to the invention thus stems, in a way, from a self-regulating phenomenon permitting the tailor-made manufacture of multimodal latices containing a number of classes of elementary particles whose mean size is preestablished as a function of the mean size of the classes of elementary particles of the initiating multimodal seed latex.

For the purposes of the present invention, vinyl chloride polymers are intended to mean vinyl chloride homopolymers and copolymers containing at least 80% and, preferably, 90% by weight of vinyl chloride. The process according to the invention applies, therefore, both to the homopolymerisation of vinyl chloride and to its copolymerisation with ethylenically unsaturated monomers such as, for example, vinyl acetate. Nevertheless, it applies preferably to the homopolymerisation of vinyl chloride.

Nonmicellar aqueous emulsion polymerization is intended to mean the polymerisation in the presence of emulsifier in a quantity lower than the critical micelle concentration.

The critical micelle concentration of an emulsifier is identical to the concentration corresponding to a change in the slope of the curves describing the variation of a physical property of a solution of emulsifier, such as, for example, the surface tension, as a function of its emulsifier concentration. The critical micelle concentration of many emulsifiers is dealt with in the work "Polymer Handbook" edited by J. Brandrup and E. H. Immergut, second edition, 1975, II-483 to II-497.

The seeding ratio, that is to say the weight quantity of seed expressed as solids, used per 100 parts by weight of monomer(s) is not really critical and is, as a general rule, between 0.5 and 20% and, preferably, between 1 and 10% by weight.

Plastisols of excellent quality are obtained when vinyl chloride polymers originating from trimodal latices are employed to prepare them.

According to a preferred embodiment of the present invention, trimodal latices of vinyl chloride polymers are produced. To do this, use is made as seed of a trimodal latex consisting of three classes of elementary particles and still more particularly a trimodal seed latex including the three classes of elementary particles which have mean diameters of between 0.15–0.30 $\mu m$, between 0.45–0.60 $\mu m$ and between 1.05–1.25 $\mu m$ respectively, originating from a preceding polymerization cycle.

The method in which the initiating multimodal seed latex is obtained is not critical. The initiating seed latex can therefore be produced in any known and suitable manner, for example by mixing a number of monomodal latices or by seeded polymerization in the presence of a number of monomodal seed latices.

The preferred initiating trimodal seed latex is preferably produced by mixing, in weight proportions of the order of 2 to 1, a monomodal latex whose elementary particles have a mean diameter of beween 0.45–0.60 $\mu m$ with a bimodal latex whose two classes of elementary particles have mean diameters of between 0.15–0.30 $\mu m$ and between 0.85–1.20 $\mu m$ respectively.

The monomodal seed latex whose elementary particles have a mean diameter of between 0.45–0.60 $\mu m$ is itself obtained advantageously by nonmicellar seeded polymerisation of vinyl chloride on a monomodal seed latex whose elementary particles have a mean diameter of 0.15–0.30 $\mu m$ with a seeding ratio of 10 to 15%, so as to enlarge the seed particles without creating new particles. A part of the monomodal latex thus obtained can then be used as seed for producing, by nonmicellar seeded polymerization with a seeding ratio of 5 to 10%, a bimodal seed latex whose two classes of elementary particles have mean diameters of between 0.15–0.30 μm (new particles) and between 0.85–1.20 μm respectively (enlarged particles).

Apart from the presence of a multimodal seed latex and the initiation of the seeded polymerisation in the presence of emulsifier in a quantity lower than its critical micelle concentration, the seeded aqueous emulsion polymerisation of vinyl chloride according to the process of the invention takes place in the usual conditions of aqueous emulsion polymerisation of vinyl chloride. Thus, the polymerization temperature generally lies between 40° and 70° C. and the polymerisation is carried out with the use of water-soluble initiators and emulsifying agents, more particularly of anionic emulsifiers, present in the usual quantity. By way of examples of usual initiators there may be mentioned water-soluble peroxides such as sodium, potassium or ammonium persulphates, hydrogen peroxide, perborates and t-butyl hydroperoxide, which are employed by themselves or in combination with a reducing agent. The initiators are usually used in a proportion of approximately 0.020 to 0.040% by weight relative to vinyl chloride monomer. By way of examples of usual anionic emulsifiers there may be mentioned the alkali-metal salts of fatty acids, of sulphonic acids, of sulphosuccinic acids or of sulphuric esters. The nature of the emulsifier has no influence on the mean size of the elementary particles. The overall quantity of emulsifier used commonly varies between 0.5 and 2.5% by weight relative to vinyl chloride monomer and, more particularly, between 0.5 and 1.5% by weight. As mentioned above, it is essential to initiate the seeded polymerization in the presence of emulsifier in a quantity lower than its critical micelle concentration. The remainder of the emulsifier is introduced gradually during polymerization with a view to ensuring an effective protection of the polymer particles at all times. The beginning of gradual introduction of the remaining emulsifier advantageously takes place at a time when the number of particles is fixed, in other words, generally when the degree of conversion is between 5 and 20%, preferably between 5 and 15%, and more particularly in the region of 10%. The introduction may be continued until the end of polymerization. Nevertheless, arrangements are preferably made for all the emulsifier to be used to be introduced before the degree of conversion exceeds 80%.

After polymerization, the latex is sprayed mechanically, for example by means of a centrifugal disc or of compressed air jets, into a stream of hot air, so as to produce the evaporation of the water present in each droplet. The dry vinyl chloride polymer is in the form of a powder consisting of hollow spheres (coenospheres) whose mean diameter is between 10 and 100 μm and, preferably, between 15 and 25 mm. The coenospheres are then milled mechanically with a view to obtaining a fine powder consisting of particles whose volume-average diameter is between 5 and 20 μm and preferably between 8 and 13 μm.

After milling so as to reduce them to fine powders of appropriate size, the vinyl chloride polymers originating from the latices produced according to the process of the invention can be employed for the formulation of low-viscosity plastisols. The plastisols are formulated in a well-known manner, by mixing the milled powders with the usual ingredients such as plasticisers, heat stabilisers, filling substances, lubricants, pigments and the like. The vinyl chloride polymer plastisols usually contain from 35 to 120 and, preferably, from 40 to 55 parts by weight of plasticiser per 100 parts by weight of vinyl chloride polymers.

The present invention also relates to the use of the vinyl chloride polymers originating from the multimodal latices produced according to the process of the invention for the formulation of plastisols.

The example which follows is intended to illustrate the process according to the invention.

All the tests are carried out in a stainless steel laboratory reactor of 3.4 liter capacity, fitted with a jacket in which a heat-transfer fluid circulates, and a conventional stainless steel bladed stirrer.

1. Manufacture of the Initiating Trimodal Seed Latex

A. Monomodal seed latex (mean diameter of the elementary particles: 0.15–0.30 μm)

1440 g of demineralised water and 0.0042 g of copper sulphate pentahydrate (that is, 42 ml of an aqueous solution at a concentration of 0.1 g/l) are introduced in succession into the reactor at room temperature. The reactor is closed and the stirrer s set to run at 250 rev/min. Vacuum (130 mm of mercury absolute) is then applied twice and, between the two operations, the reactor is purged with technical-grade nitrogen at a pressure of 600 mm of mercury absolute. 1200 g of vinyl chloride are then introduced and the temperature of the reactor contents is gradually raised to 52° C. At the time when it reaches 52° C., taken to be the zero time of the polymerization ($t_0$), 0.48 g of ammonium persulphate (that is 24 ml of an aqueous solution at a concentration of 20 g/l) are introduced. After 15 minutes 1.16 g of ammonia (that is 33 ml of 2N aqueous ammonia) are introduced. Between $t_0+1$ hour and $t_0+5H$, 15, 12 g of ammonium myristate (that is 109 ml of an 11% solution) are introduced gradually. After a pressure drop of 0.5 bar the temperature is raised to 80° C. When this temperature is reached, 1.16 g of ammonia are introduced again. The stirring rate is reduced to 50 rev/min and after antifoaming agent has been introduced, the residual vinyl chloride is removed by degassing and stripping with boiling.

2780 g of monomodal polyvinyl chloride latex are collected, with a solids content of 39.6% as elementary particles whose mean diameter (determined by the photosedimentometry method) is 0.25 μm.

B. Monomodal seed latex (mean diameter of the elementary particles: 0.45–0.60 μm)

1700 g of demineralised water, 0.0035 g of copper sulphate pentahydrate (that is 35 ml of a solution at a concentration of 0.1 g/l) and 140 g of polyvinyl chloride in the form of the latex originating from stage 1.A. (that is 353 g of latex) are introduced in succession into the reactor. The procedure is identical to that described above. The nature and the quantity of the polymerisation ingredients used are repeated below:

| | |
|---|---|
| ammonium persulphate: | 0.40 g |
| ammonia (initial): | 1.07 g |
| ammonium myristate: | 7 g |
| vinyl chloride: | 1000 g |
| ammonia (end of polymerization): | 1.07 g |

3214 g of monomodal polyvinyl chloride latex are collected, with a solids content of 33% as elementary particles whose mean diameter is 0.55 μm.

Alternative version: This procedure consists in manufacturing, in the same single reactor, a first monomodal seed latex whose elementary particles have a mean diameter of 0.25 μm and, without isolating the said latex, in enlarging it by subsequent polymerization of a new quantity of vinyl chloride.

In a first stage, a reduced quantity of vinyl chloride, that is 150 g is polymerised under conditions identical to those described under point 1.A. The nature and the quantity of the polymerization ingredients used are repeated below:

| demineralised water: | 1845 g |
|---|---|
| ammonium persulphate: | 0.615 g |
| ammonia (initial): | 1.144 g |

After a pressure drop of 4 bars 1080 g of vinyl chloride are introduced. 15 minutes after the introduction of vinyl chloride, 9.84 g (that is 89.5 cm$^3$ of an 11% solution) of ammonium myristate are introduced gradually. After a pressure drop of 1 bar the temperature is raised to 80° C. and 1.144 g of ammonia are introduced. The stirring rate is reduced to 50 rev/min, 7.5 g of antifoaming agent are introduced and the unconverted vinyl chloride is removed by degassing and stripping with boiling.

3170 g of monomodal latex are collected, with a solids content of 35.7% of elementary particles whose mean diameter is 0.55 μm.

C. Bimodal seed latex (mean diameter of the two classes of elementary particles: 0.15-0.30 μm and 0.85-1.20 μm)

70 g of polyvinyl chloride are introduced into the reactor in the form of the latex produced according to either of the variants described under point 1.B., whose elementary particles have a mean diameter of 0.45-0.60 μm. The general conditions of the (seeded) polymerisation are those described under point 1.A. The nature and the quantity of the polymerization ingredients are detailed below.

| demineralised water | 1015 g |
|---|---|
| copper sulphate pentahydrate | 0.004 g |
| ammonium persulphate | 0.46 g |
| ammonia | 1.242 g |
| ammonium myristate | 10 g |
| vinyl chloride | 1150 g |

2507 g of bimodal latex are collected, with a solids content of 45%, containing two classes of elementary particles whose mean diameters are 0.25 μm and 0.95 μm respectively.

D. The initiating trimodal seed latex is obtained by mixing two parts by weight of monomodal latex produced under point 1.B. with 1 part by weight of bimodal latex produced under point 1.C.

2. Manufacture of Trimodal Latex by Seeding Using the Initiating Trimodal Latex 70 g of polyvinyl chloride are introduced into the reactor in the form of the seed latex produced under point 1.D.

The general polymerization conditions, the nature and the quantity of the polymerisation ingredients and the quantity of latex collected and its concentration are identical to those of Example 1.C.

The trimodal latex produced is made up of three classes of elementary particles whose mean diameters are between 0.15-0.30 μm, 0.45-0.60 μm and 1.05-1.25 μm respectively.

3. Manufacture of Trimodal Latex by Seeding Using the Trimodal Latex Originating from a Preceding Polymerisation Cycle 70 g of polyvinyl chloride are introduced into the reactor in the form of the latex obtained under point 2.

The general polymerization conditions, the nature and the quantity of the polymerisation ingredients and the quantity of latex collected and its concentration are identical to those of Example 1.C.

The trimodal latex produced is made up of three classes of elementary particles whose mean diameters are between 0.15-0.30 μm, 0.45-0.60 μm and 1.05-1.25 μm respectively.

A 155-g portion of the trimodal latex produced (that is 70 g of polyvinyl chloride) is taken out before isolating the polymer with a view to using it as a seed latex in a following polymerization cycle.

4. Drying and Milling of the Trimodal Latex

The trimodal latex produced under point 3. is dried in a spray drier in which the temperature of the hot air is 175°-200° C. at the entry and 75°-85° C. at the exit. At the exit of the drier the dry polyvinyl chloride is recovered in the form of a powder consisting of coenospheres whose mean diameter is 45 μm.

The dried polyvinyl chloride is then milled in a pin mill so as to reduce the mean particle diamter to 12 μm.

5. Preparation and Evaluation of a Plastisol

A plastisol in accordance with ISO standard 4612 by mixing, in a planetary mixer, 100 g of milled polyvinyl chloride produced under point 4. with 40 g of dioctyl phthalate (temperature: 23° C.; stirring rate: 1 minute at 60 rev/min, 19 min at 120 rev/min) (Plastisol E).

By way of comparison, an identical plastisol is prepared, except that the polyvinyl chloride originates from the bimodal latex produced under point 1.C., dried and milled under the conditions detailed under point 4. (Plastisol C).

The initial viscosity of the two plastisols is evaluated in a rotary viscometer in accordance with ISO standard 3219. The results of the evaluation of the initial viscosity at two velocity gradients appear in the table below.

TABLE

| Plastisol | Velocity gradient, s$^{-1}$ | Viscosity, Pa s |
|---|---|---|
| E (example) | 1.4 | 17 |
|  | 400 | 16 |
| C (comparative) | 1.4 | 35 |
|  | 400 | 32 |

We claim:

1. A process for the production of a multimodal latex of vinyl chloride polymers comprising: initiating non-micellar aqueous emulsion polymerization of vinyl chloride in the presence of a seed consisting of a multimodal latex originating from a preceding polymerization cycle to produce a multimodal latex having an identical number of classes of particles as said seed, said classes of particles having an identical mean grain size distribution as said seed.

2. The process for the production of a multimodal latex of vinyl chloride polymers in accordance with claim 1, having a seeding ratio between about 0.5 and 20% by weight.

3. The process for the production of a multimodal latex of vinyl chloride polymers in accordance with claim 2, wherein the seeding ratio is between about 1 and 10% by weight.

4. The process for the production of a multimodal latex of vinyl chloride polymers according to claim 1, wherein the seed latex consists of a trimodal latex.

5. The process for the production of a multimodal latex of vinyl chloride polymers according to claim 4, wherein the trimodal seed latex comprises three classes of elementary particles having mean diameters between about 0.15–0.30 µm, between about 0.45–0.60 µm and between about 1.05–1.25 µm respectively.

6. The process for the production of a multimodal latex of vinyl chloride polymers according to claim 5, wherein the initiating trimodal seed latex is produced by mixing, in weight proportions of the order of 2 to 1, a monomodal latex whose elementary particles have a mean diameter of between about 0.45–0.60 µm with a bimodal latex whose two classes of elementary particles have mean diameters of between about 0.15–0.30 µm and between about 0.85–1.20 µm respectively.

7. The process for the production of multimodal latices of vinyl chloride polymers according to claim 2, characterised in that the seed latex consists of a trimodal latex.

8. Process for the production of multimodal latices of vinyl chloride polymers according to claim 3, characterised in that the seed latex consists of a trimodal latex.

9. A method of formulating plastisols, comprising the step of using the vinyl chloride polymers originating from the multimodal latices of vinyl chloride polymers produced according to claim 1.

* * * * *

UNITED STATES PATENT AND TRADEMARK OFFICE
CERTIFICATE OF CORRECTION

PATENT NO. : 5,300,551
DATED : April 5, 1994
INVENTOR(S) : Paul CANDRIES et al.

It is certified that error appears in the above-indentified patent and that said Letters Patent is hereby corrected as shown below:

Column 8, line 11,

The process for the production of multimodal latices of vinyl chloride polymers according to claim 3, characterised in that the seed latex consists of a trimodal latex.

Signed and Sealed this

Second Day of August, 1994

*Attest:*

BRUCE LEHMAN

*Attesting Officer*     *Commissioner of Patents and Trademarks*